United States Patent [19]

Takahashi

[11] Patent Number: 4,759,471
[45] Date of Patent: Jul. 26, 1988

[54] PROCESS FOR DISPENSING FRUIT JUICE BEVERAGES

[75] Inventor: Yutaka Takahashi, Kanagawa, Japan

[73] Assignee: Kirin Beer Kabushiki Kaisha, Tokyo, Japan

[21] Appl. No.: 755,545

[22] Filed: Jul. 16, 1985

Related U.S. Application Data

[63] Continuation of Ser. No. 574,914, Jan. 30, 1984, abandoned.

[30] Foreign Application Priority Data

Feb. 3, 1983 [JP] Japan ................................. 58-16567

[51] Int. Cl.$^4$ ..................... G01F 11/00; A23L 2/02; A23L 2/32
[52] U.S. Cl. ...................................... 222/1; 426/487; 426/518
[58] Field of Search ............... 426/599, 487, 486, 518, 426/519; 222/1, 56, 71; 62/177; 137/1; 99/275

[56] References Cited

U.S. PATENT DOCUMENTS

| | | | |
|---|---|---|---|
| 2,696,440 | 12/1954 | Ball | 426/599 |
| 3,040,647 | 6/1962 | Gluckstein et al. | 99/275 |
| 3,236,655 | 2/1966 | Murch | 426/50 |
| 3,391,009 | 7/1968 | Fehlberg et al. | 426/487 |
| 3,518,093 | 5/1970 | Ashti | 426/546 |
| 3,727,640 | 4/1973 | Sargeant | 99/275 |
| 3,745,020 | 7/1973 | Lime et al. | 426/519 |
| 3,749,585 | 7/1973 | Cruse et al. | 426/519 |
| 4,089,985 | 5/1978 | Wolff | 426/615 |
| 4,296,136 | 10/1981 | Ziccarelli et al. | 426/431 |

FOREIGN PATENT DOCUMENTS

2207652 7/1974 France .............................. 426/629

OTHER PUBLICATIONS

Nelson, P. E. et al., *Fruit and Vegetable Juice Processing Technology;* AVI Publ. Co., Westport, Conn., 1980, pp. 436–439, 444–447, 458–465, 489–505.

*Primary Examiner*—Elizabeth Weimar
*Attorney, Agent, or Firm*—Ladas & Parry

[57] ABSTRACT

A process for preparing fruit juice beverages capable of being sold in cups via dispensing vending machines which comprises the steps of subjecting a fruit juice containing solid matter to milling, deaeration, homogenization and optional pasteurization, the milled juice being dispensed through a flow quantity control means substantially without clogging at the flow quantity control means.

8 Claims, No Drawings

PROCESS FOR DISPENSING FRUIT JUICE BEVERAGES

This is a continuation of co-pending applicaton Ser. No. 574,914 filed on Jan. 30, 1984, now abandoned.

BACKGROUND OF THE INVENTION

This invention relates to processes for preparing fruit juice beverages containing solid matter such as pulp materials. More particularly, the present invention relates to fruit juice beverages containing solid matter which can be served and sold in cups dispensed by vending machines and to a process for producing the beverages.

Heretofore, a fruit juice beverage containing solid matter could not be sold by means of a cup dispensing type vending machine. The reasons for this has been as follows.

The cup dispensing type vending machine (hereinafter sometimes referred to as a dispenser) has a flow quantity control means or metering means generally comprising a cylinder and a piston therein and operating to regulate the quantity of each cupful serving of the beverage dispensed. When a fruit juice beverage containing solid matter is introduced into this flow quantity control means, the solid matter in some instances accumulates in the flow quantity control means or clogs the space between the cylinder and piston of the flow quantity control means, which thereby cannot be accurately operated.

Accordingly, it has been impossible to sell via a dispenser fruit juice containing solid matter when the fruit has been squeezed in a natural state unless the solid matter is previously removed by filtering or treating it with an enzyme. However, fruit juice from which solid matter has been removed has a drawback in that it lacks a natural flavor and mouth feel. Accordingly, there has been a demand for fruit juice beverages containing solid matter which can be sold in cups via a dispenser.

We have carried out studies directed toward the sale of fruit juice beverages containing solid matter in cups via a dispenser by improving the flow quantity control means. However, the maximum dimension (longitudinal dimension) of the particles of the solid matter such as pulp materials contained in fruit juice beverages is as large as several centimeters, and, therefore, even if the flow quantity control means is considerably improved, it is not possible to sell such fruit juice beverages via a dispenser unless the fruit juice beverages per se are improved.

SUMMARY OF THE INVENTION

It is an object of the present invention to provide fruit juice beverages containing solid matter such as pulp materials which can solve the problems described above and which can be sold in cups via a dispenser provided with a flow quantity control means.

A process for preparing a fruit juice beverage containing solid matter according to the present invention is characterized in that: (a) a fruit juice containing solid matter is subjected to a milling treatment to reduce the solid matter contained therein to a maximum dimension of 500 microns or less, preferably 200 microns or less; (b) the milled fruit juice is subjected to a deaeration treatment to remove air bubbles occluded therein; and (c) the deaerated fruit juice is subjected to a homogenization treatment to prevent phase separation of the resulting fruit juice, a pasteurization treatment being carried out as needed.

DETAILED DESCRIPTION OF THE INVENTION

The term "fruit juice" as used herein is intended to mean and include fruit juices obtained from melons, mandarin oranges, strawberries, grapes, apples, oranges, grapefruits and the like, as well as fruit juices obtained from tomatoes, watermelons and the like which are called fruits in a broad sense. Further, the term "fruit juice" is intended to mean and include: fruit juices obtained by directly squeezing the fruits enumerated above; those sirup obtained by adding additives such as sugars and coloring agents to fruit juices which have been obtained by directly squeezing the fruits; and those obtained by partially diluting such fruit juices with water and the like.

The term "solid matter" is intended to mean and include stone cells, fine seeds or the like in addition to pulp materials.

According to this invention, a fruit juice containing solid matter is first subjected to a milling treatment. The milling treatment can be carried out by passing the fruit juice between rotary grindstones or causing it to contact and pass through a rotary blade or the like. It is desirable that the longitudinal or maximum dimension of the solid matter be reduced to 500 microns or less, preferably 200 microns or less, by the milling treatment. By milling the solid matter to the dimension as specified above, clogging of the flow quantity control means of the dispenser is prevented, and at the same time the mouth feel of the beverage is significantly improved.

When the fruit juice containing solid matter is subjected to the milling treatment, a large mechanical force is applied to the fruit juice, and therefore a number of fine air bubbles become occluded in the fruit juice due to cavitation and air entanglement phenomena. Accordingly, the milled fruit juice is subjected to a deaeration treatment. While this deaeration treatment can be carried out by vacuum deaeration, pressure deaeration, bubbling deaeration, boiling deaeration, or like technique, vacuum deaeration is preferred.

By subjecting the fruit juice to the deaeration treatment, it is possible to prevent flotation or separation of the solid matter which may be attributed to buoyancy generated by air bubbles deposited on the solid matter. When the solid matter floats and separates, a phase separation occurs and vending of the fruit juice via the dispenser becomes impossible. Thus, the deaeration treatment of the fruit juice is important.

The deaerated fruit juice containing solid matter is then subjected to a homogenization treatment. This homogenization treatment can be accomplished by treating the fruit juice in a homogenizer (a machine for homogenizing liquids) or the like at a temperature of up to 90° C., preferably from 50° to 90° C. (i.e., warmed conditions). In the homogenization of the fruit juice, it is not an absolutely necessary requirement to warm the fruit juice to a temperature of from 50° to 90° C. That is, homogenization treatment may be carried out at room temperature.

By subjecting the fruit juice to the homogenization treatment, some fruit juices become viscous because of the action of pulp pectin materials contained in the fruit juice.

After the fruit juice has been subjected to the homogenization treatment, a heat pasteurization treatment may be carried out as needed. The pasteurization treatment can be carried out by, for example, an instantaneous pasteurization operation wherein the fruit juice is retained for from 10 to 60 seconds at a temperature of from 85° to 95° C.

When it is necessary to add sugars, flavoring matter and the like to the fruit juice, the addition can be carried out in any process step. It is preferable to add sugars and the like immediately before the homogenization step. When sugars are added before the homogenization step, the resulting fruit juice becomes more viscous, and the dispersibility of the finely milled solid matter present in the fruit juice becomes good, whereby no settling/separation of the solid matter is observed even when the fruit juice is allowed to stand for a long period of time.

In the present invention, the fruit juice containing solid matter is subjected to a series of treatments, i.e., milling treatment, deaeration treatment, homogenization treatment and optional pasteurization treatment. Therefore, no solid matter is separated and caused to settle, and it is possible to sell the fruit juice in cups via vending machines. Further, while the fruit juice obtained according to the present invention contains solid matter, it is soft and pleasant to the tongue because the solid matter is finely divided.

While the present invention is illustrated by the following example, the present invention is not limited thereto.

The following example illustrates a process for preparing a guava juice beverage which can be sold via a dispenser. A guava sarcocarp has a number of stone cells similar to those of a pear sarcocarp. When a fruit juice is squeezed from the guava sarcocarp, it contains a large amount of solid matter mainly comprising stone cells and pulp matter. Heretofore it has been generally believed that such a fruit juice cannot be dispensed by a dispenser unless the solid matter is removed. Further, guava juice containing a large amount of solid matter was not very pleasant to the tongue.

EXAMPLE

Guava juice containing a large amount of solid matter (mainly stone cells and pulp matter) was obtained from guava fruit. This guava juice was first subjected to a milling treatment, which was carried out by passing the guava juice through a milling apparatus (mill MKZ B10-10 LD Type manufactured by Masukofugyo, K.K., Japan) provided with rotary grindstones. The rotary grindstones were rotated at a speed of from 100 to 3,000 rpm, preferably 700 rpm, and the spacing of the grindstones was adjusted to a value of the order of from 0.1 to 1 millimeter. The guava juice was fed into the milling apparatus from once to several times at a rate of from 50 to 300 liters/hour. The solid matter having a size of several millimeters before milling was finely divided to sizes of 500 microns or less by the milling.

When the guava juice was subjected to the milling treatment, fine air bubbles became occluded in the fruit juice, and therefore the volume thereof was increased from 1.2 to 1.6 times. When 100 liters of the fruit juice was subjected to the milling treatment, the volume thereof became as large as 150 liters.

The guava juice thus milled was subjected to a vacuum deaeration treatment. The vacuum deaeration treatment was carried out by feeding the guava juice into a thin-film type deaeration apparatus DA-50 Type equipped with a water jet vacuum generator, which is operated in a spray stream (manufactured by Kokusan Seikō, K.K., Japan), at a treatment rate of from 10 to 200 liters/hour under a degree of vacuum of from 150 to 750 mmHg. Air bubbles present in the guava juice were substantially removed by this vacuum deaeration treatment.

Sugars and flavoring matter were then added to the thus obtained guava juice, and thereafter the fruit juice was subjected to a homogenization treatment while being warmed to a temperature of the order of 60° C. The homogenization treatment was carried out by feeding the fruit juice into a machine for homogenizing liquids (three-throw homogenizer H3-1C Type manufactured by Mitsumaru Kikai, Japan) at a treatment rate of from 50 to 100 liters/hour under a pressure of from 80 to 200 kg/cm$^2$.

When sugars and flavoring matter were added before the homogenization treatment, the resulting fruit juice became more viscous. For example, in the case of a fruit juice comprising about 50% of fruit juice matter and about 50% of sugar, the viscosity of the resulting fruit juice was about 1,000 centipoises (B-type viscosimeter, at a temperature of 20° C.). When the viscosity of the fruit juice became high, the separation/settling of solid matter present in the fruit juice was more effectively prevented.

The resulting guava juice was then subjected to a pasteurization treatment, which was carried out by feeding the fruit juice into a tubular heat pasteurization apparatus and thus retaining the juice for about 30 seconds at a temperature of from 85° to 93° C.

Immediately after pasteurization, a 5-gallon stainless-steel sirup tank was filled with the resulting fruit juice. The fruit juice was cooled and thereafter provided for dispensing in cups via a dispenser.

A test was carried out wherein the guava juice treated as described above and untreated guava juice were fed into cups via a dispenser provided with a flow quantity control means having a cylinder and a piston. The results obtained are shown in Table 1.

TABLE 1

| Number of cup- fuls dispensed: (200 ml per cup) | Result of Dispensing Operation | | | |
|---|---|---|---|---|
| | 1 | 2 | 500 | 1,000 |
| Treated fruit juice | Normal | Normal | Normal | Normal |
| Untreated fruit juice | Abnormal | Outflow stopped (clogging) | — | — |

As can be seen from Table 1, no clogging or like trouble occurred even when the guava juice treated according to the present invention was dispensed many times via the dispenser.

Further, the guava juice treated according to the present invention was extremely soft and pleasant to the tongue as compared with the untreated guava juice because the solid matter was finely divided.

What is claimed is:

1. A method of serving a fruit juice beverage which has particles of solid matter, which method comprises dispensing a fruit juice beverage through a flow quantity control means, said fruit juice beverage having been produced by a process comprising the steps of:
   (a) subjecting an initial fruit juice containing solid matter to a milling treatment thereby to reduce the maximum longitudinal dimensions of the particles of said solid matter to 500 microns or less; the milled juice still having particles of a solid matter;

(b) subjecting the milled fruit juice to a deaeration treatment to remove air bubbles occluded in the fruit juice; and (c) subjecting the deaerated fruit juice to a homogenization treatment to prevent phase separation, whereby no clogging at the flow quantity control means takes place; wherein the amount of particles of solid matter said initial fruit juice is an amount sufficient to clog a flow quantity control means before subjecting said fruit juice with solid matter to steps a, b and c.

2. A method according to claim 1 wherein the milling treatment is carried out to reduce the maximum longitudinal dimensions of the particles of the solid matter to 200 microns or less.

3. A method according to claim 1 wherein the milling treatment is carried out by a rotary grindstone.

4. A method according to claim 1 wherein the deaeration treatment is carried out by vacuum deaeration.

5. A method according to claim 1 wherein the homogenization treatment is carried out by a homogenizer at a temperature of from 50° C. to 90° C.

6. A method as in claim 1 wherein the deaerated fruit juice which is subjected to a homogenization treatment to prevent phase separation is further subjected to pasteurization.

7. A method as in claim 1 further comprising adding sugars and favoring matter before the homogenization step (c).

8. A method as in claim 7 wherein the viscosity of said homogenized fruit juice is about 1000 centipoises.

* * * * *